United States Patent
Fan

(10) Patent No.: US 11,898,633 B2
(45) Date of Patent: Feb. 13, 2024

(54) METHODS AND SYSTEM FOR SHIFTING TRANSMISSIONS WITH DISSIMILAR GEAR CONFIGURATIONS

(71) Applicant: VOCIS LIMITED, Lindley (GB)

(72) Inventor: Kevin Fan, Leamington Spa (GB)

(73) Assignee: VOCIS LIMITED, Lindley (GB)

( * ) Notice: Subject to any disclaimer, the term of this patent is extended or adjusted under 35 U.S.C. 154(b) by 386 days.

(21) Appl. No.: 16/911,597

(22) Filed: Jun. 25, 2020

(65) Prior Publication Data
US 2021/0404554 A1 Dec. 30, 2021

(51) Int. Cl.
| | |
|---|---|
| *F16H 61/688* | (2006.01) |
| *F16H 59/70* | (2006.01) |
| *F16H 61/02* | (2006.01) |
| *F16H 61/00* | (2006.01) |

(52) U.S. Cl.
CPC ..... *F16H 61/688* (2013.01); *F16H 2059/702* (2013.01); *F16H 2059/706* (2013.01); *F16H 2061/0096* (2013.01); *F16H 2061/0223* (2013.01)

(58) Field of Classification Search
CPC .......... F16H 61/688; F16H 2061/0096; F16H 2061/0223; F16H 2061/0062; F16H 2059/702; F16H 2059/706; F16H 3/006; F16H 2003/0931
See application file for complete search history.

(56) References Cited

U.S. PATENT DOCUMENTS

| | | | |
|---|---|---|---|
| 9,217,502 B2 | 12/2015 | Wierzbowski | |
| 2011/0263383 A1 | 10/2011 | Ostberg et al. | |
| 2015/0233470 A1* | 8/2015 | Seay | F16H 61/0213 701/55 |
| 2020/0257282 A1* | 8/2020 | Lavoie | G05D 1/00 |

FOREIGN PATENT DOCUMENTS

KR 101463691 B1 * 11/2014

OTHER PUBLICATIONS

KR101463691 translation (Year: 2014).*
"Gear-Change Robot," AB Dynamics Website, Available Online at https://www.abdynamics.com/resources/files/SP6211-i7-Gear-Change-Robot.pdf, Jun. 5, 2019, 2 pages.

* cited by examiner

*Primary Examiner* — Timothy Hannon
(74) *Attorney, Agent, or Firm* — McCoy Russell LLP

(57) ABSTRACT

Methods and systems for generating control instructions for a plurality of transmissions having dissimilar gear configurations via a common software framework are described. In one example, the common software framework provides a graphic interface whereby a user/implementer describes configurations of different transmissions. The software framework generates instructions for different transmission controllers that shift the transmissions.

12 Claims, 12 Drawing Sheets

METHODS AND SYSTEM FOR SHIFTING TRANSMISSIONS WITH DISSIMILAR GEAR CONFIGURATIONS

FIELD

The present description relates generally to methods and systems for generating shifting control instructions for a variety of transmission configurations. The methods and systems may be applied to generate control instructions for shifting transmissions having dissimilar torque paths via instructions generated from a common software framework.

BACKGROUND AND SUMMARY

A vehicle may include a transmission to deliver torque from a propulsion source to vehicle wheels. The transmission may allow the propulsion source to operate in an efficient operating region so that energy may be conserved. In addition, the transmission may also allow the propulsion source to deliver large amounts of torque at low vehicle speeds to improve a rate of vehicle acceleration. A transmission may be designed according to vehicle attributes so that a desired level of vehicle efficiency and performance may be provided. Consequently, a first transmission may include six forward gears that may be engaged while a second transmission may include ten forward gears. Further, the first transmission may include a single input shaft and a single output shaft while the second transmission may include two input shafts and one output shaft. A first controller with instructions may be configured shift the first transmission and a second controller with instructions different from instructions of the first controller may be configured to shift the second transmission. The instructions for shifting the first transmission may be generated via a human programmer, and the instructions for shifting the first transmission may be unique to a first transmission controller. The instructions for shifting the second transmission may be generated via the same human programmer or via a different human programmer. However, generating controller instructions for each transmission configuration in this way may be inefficient and costly. Therefore, it may be desirable to provide a way of generating instructions for different transmission controllers that is more efficient.

The inventor herein has recognized the above-mentioned issues and has developed a common system for generating executable instructions for shifting specific transmissions, comprising: a computer readable medium including executable instructions to generate a first group of tables and a second group of tables, the first group of tables describing torque paths through a first transmission, the second group of tables describing torque paths through a second transmission, receive data into the first group of tables and the second group of tables via a user, generate executable instructions for a first transmission controller to shift the first transmission according to data in the first group of tables, generate executable instructions for a second transmission controller to shift the second transmission according to data in the second group of tables, the first transmission configured with torque paths that are different than torque paths of the second transmission.

By allowing a human user or implementer to define a transmission configuration via generating tables populated by a user, it may be possible to generate transmission shifting instructions for a controller via a common software framework. The common software framework may reduce an amount of time and effort that may be needed to generate transmission shifting control software for different transmissions and their controllers. In particular, the common software framework may accept a plurality of transmission configurations via input into a plurality of tables. The tables may be used to describe relationships between transmission coupling components and transmission actuators. In this way, a common software framework may be the basis for generating instructions to shift a plurality of different transmissions that are configured with different torque paths and gear arrangements.

The present description may provide several advantages. In particular, the approach may reduce software development costs. Further, the approach may reduce software development time. In addition, the approach may provide for generating more consistent instructions for shifting transmissions, thereby improving system reliability.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
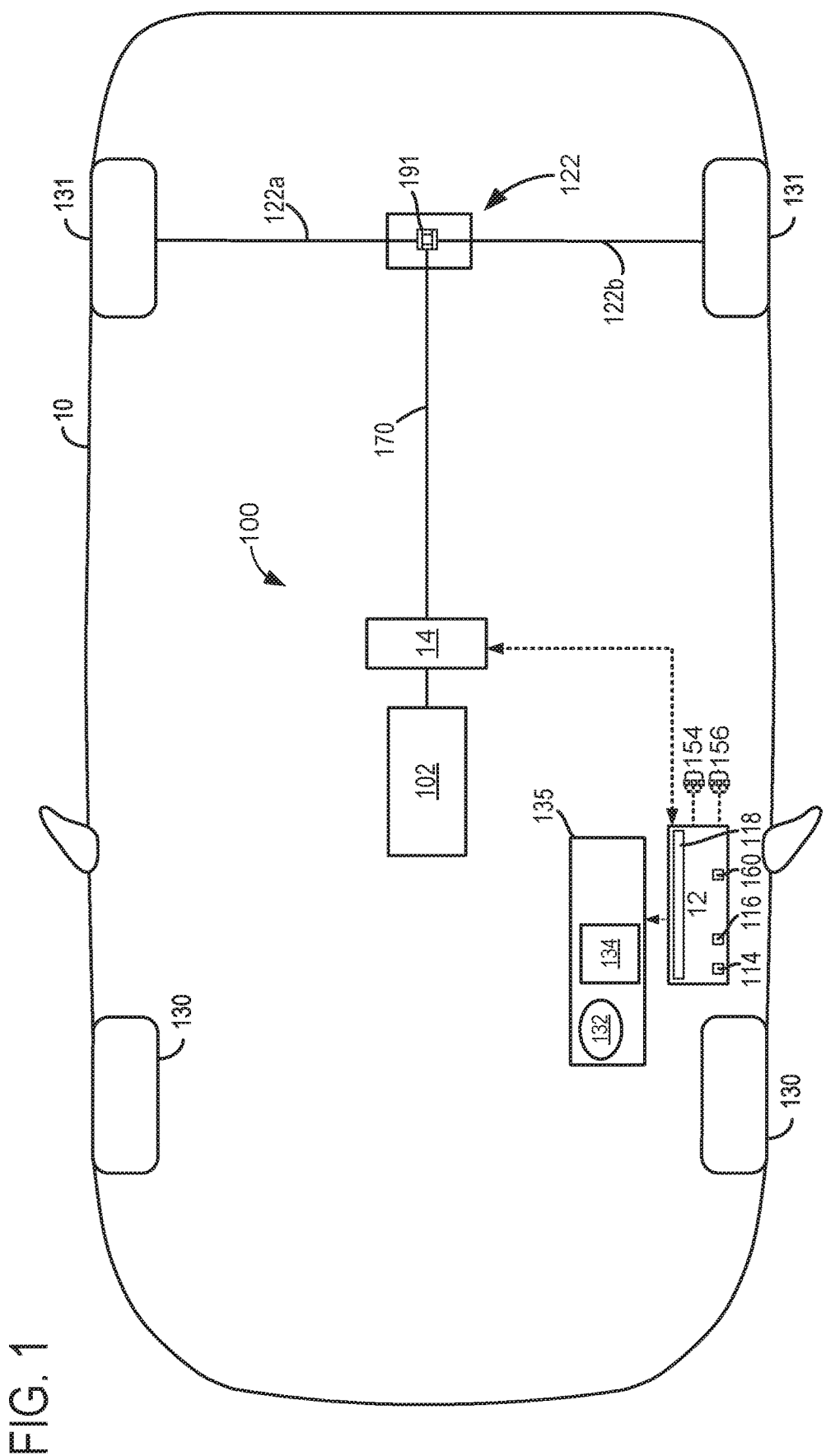
FIG. 1 is a schematic diagram of a vehicle driveline that includes a transmission.
Figure 2:
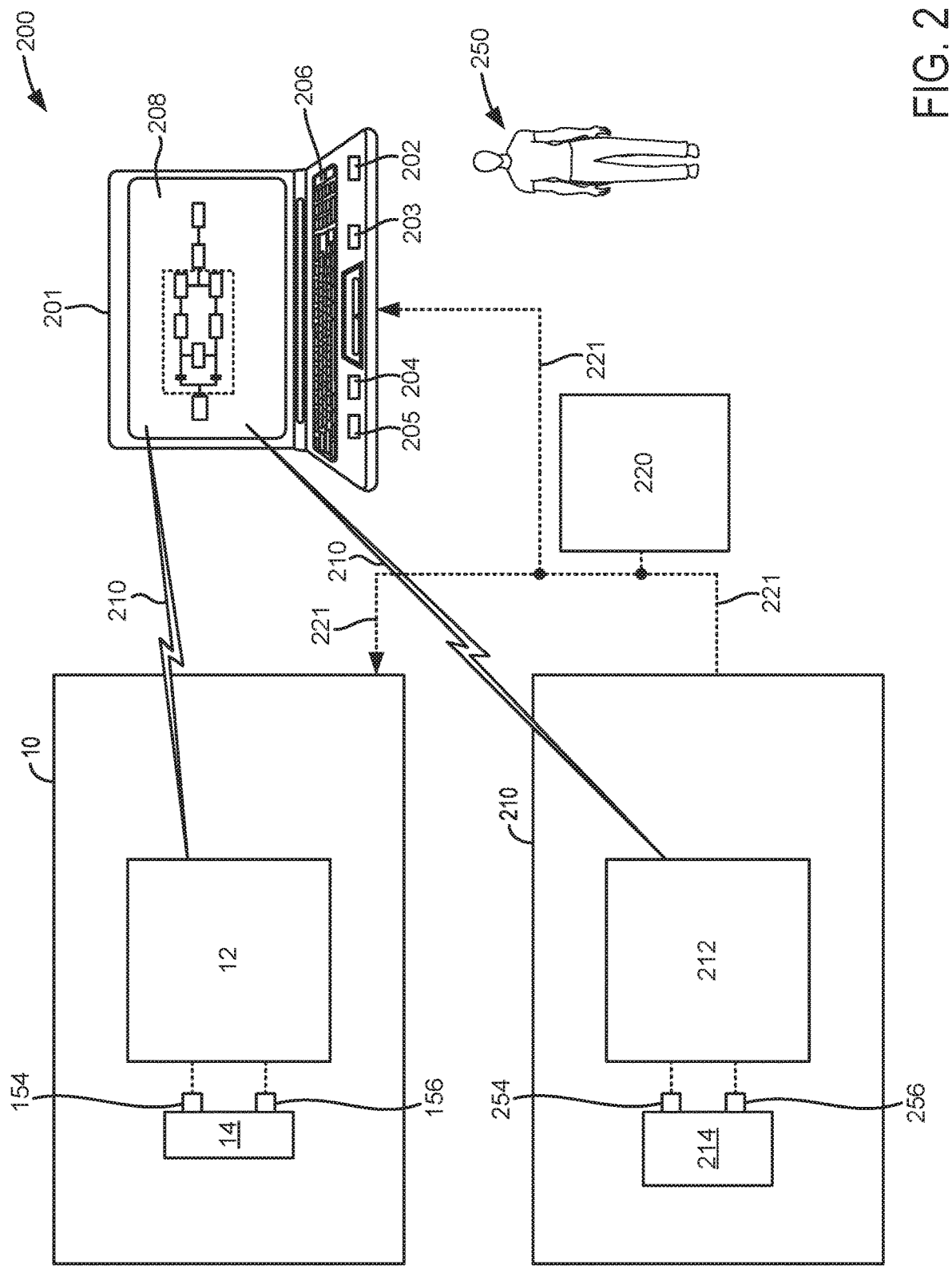
FIG. 2 is a schematic diagram of a system that includes a common software framework for generating instructions to control transmissions that have different torque paths.
Figure 3:
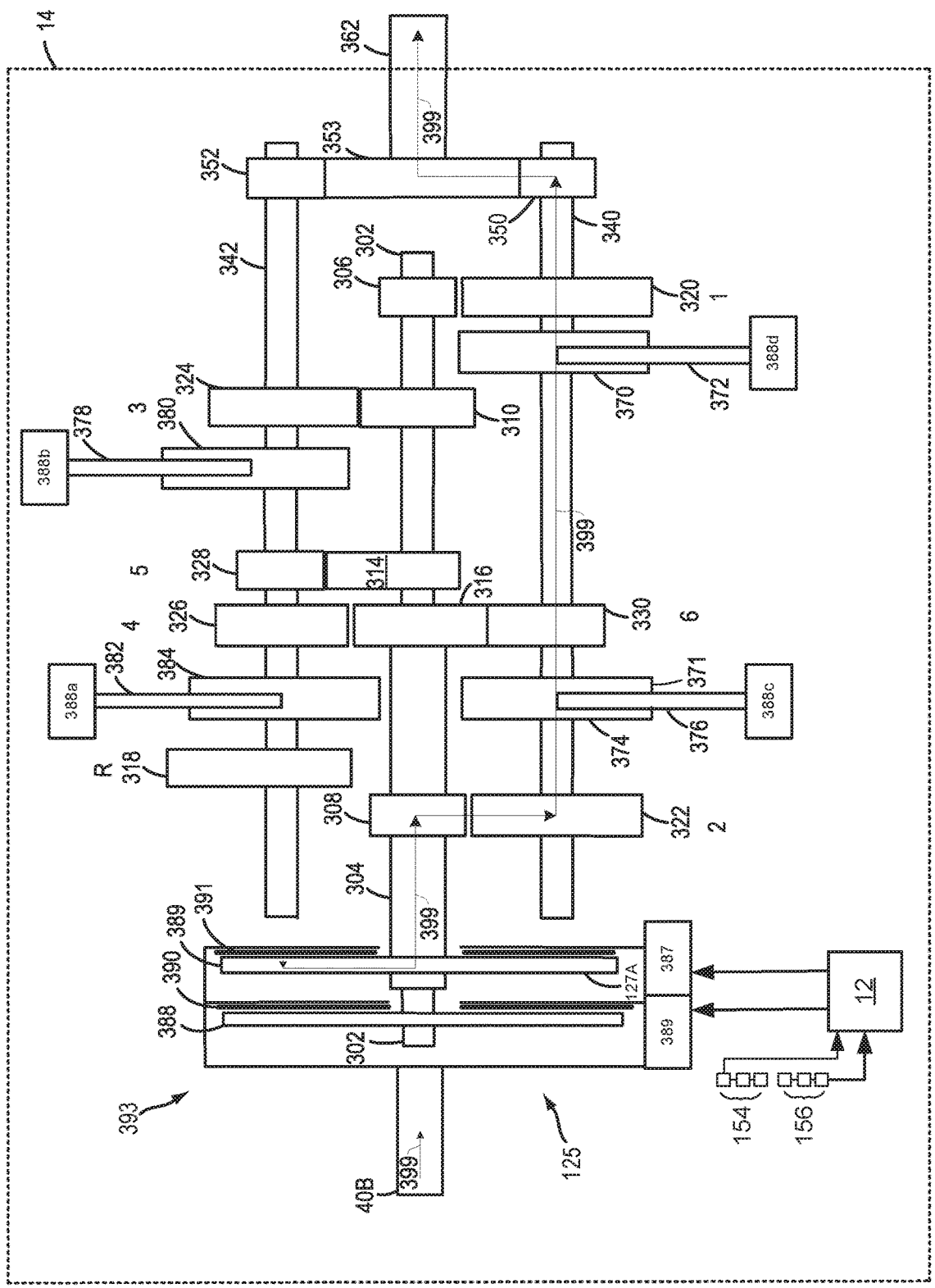
FIG. 3 is a schematic diagram of an example transmission that may be shifted via instructions generated from the common software framework.
Figure 4:
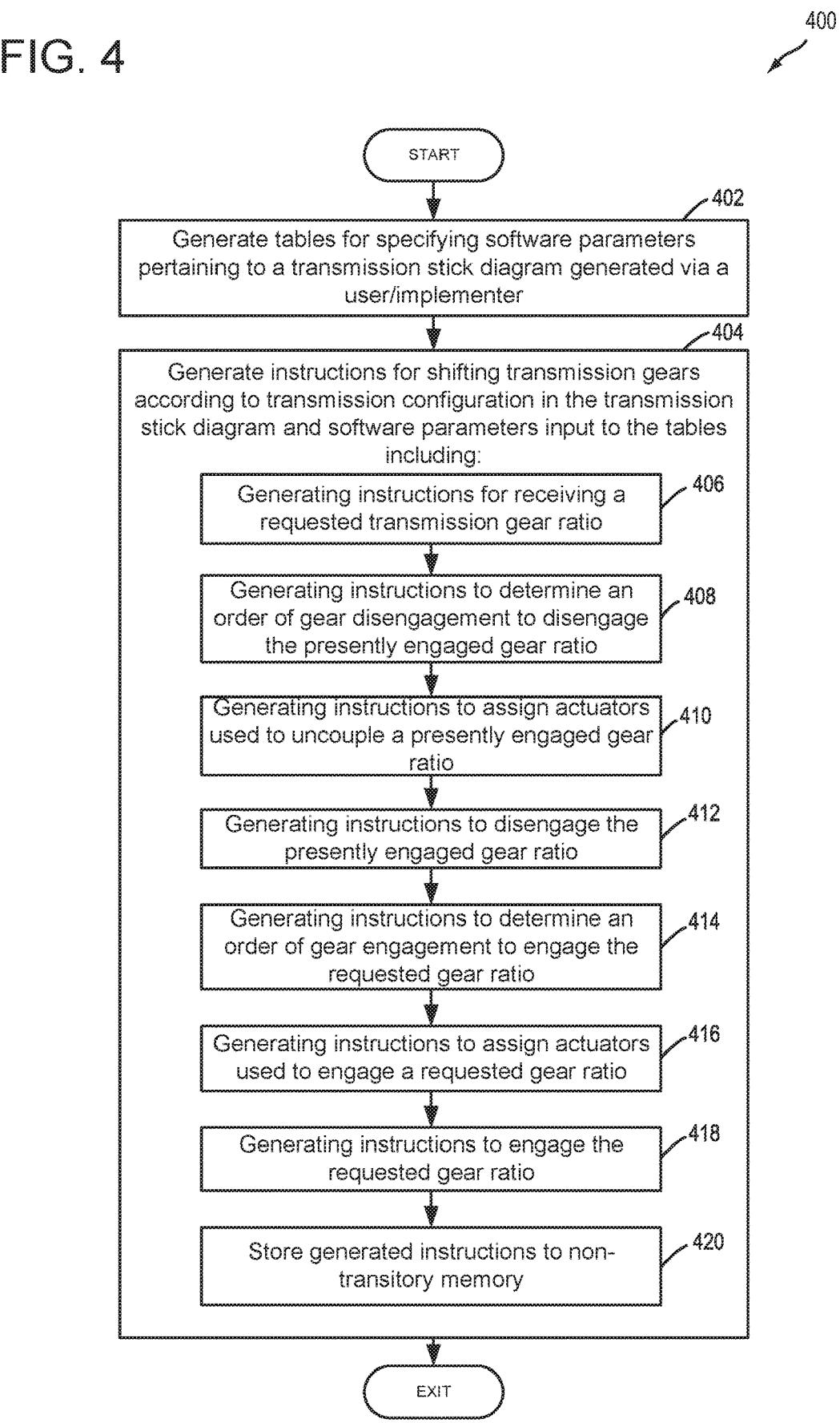
FIG. 4 is a flowchart of a method for generating executable instructions via the common software framework to shift transmissions that are configured differently.
Figure 5A:
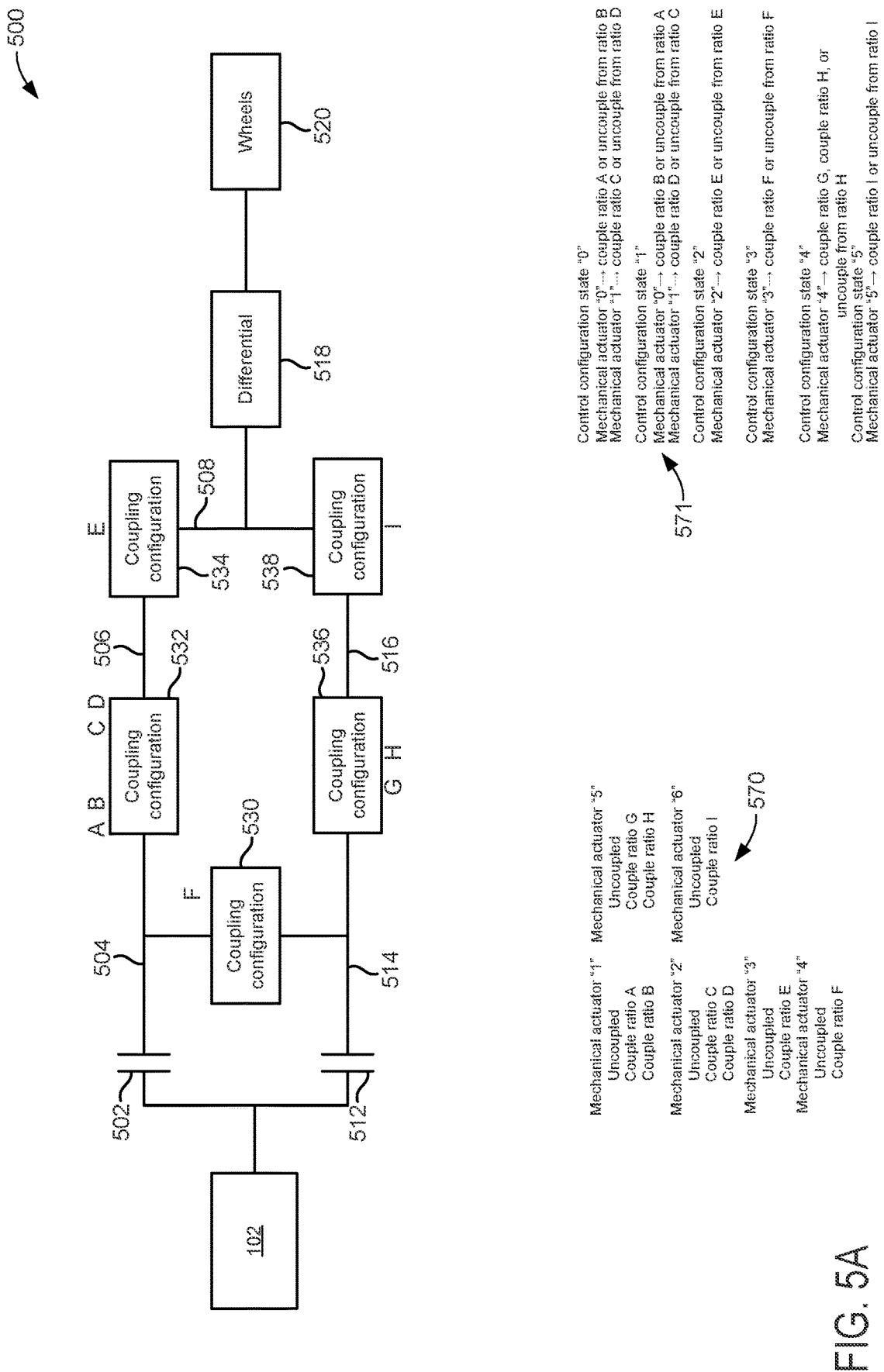
FIGS. 5A-5C show a stick diagram and features of an abstract transmission that may be a basis for generating transmission shifting instructions via the common software framework.
Figure 5B:
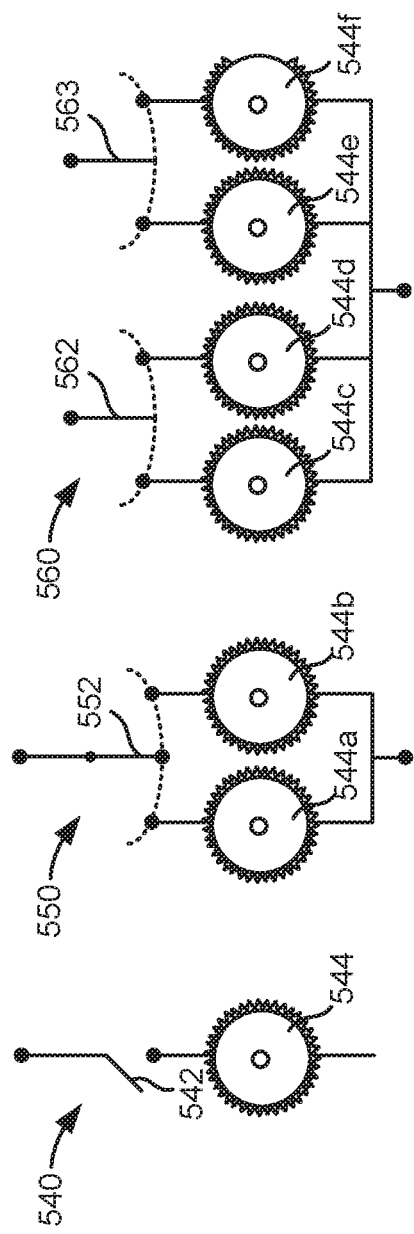
Figure 5C:
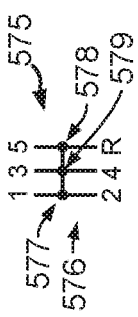

The following description relates to systems and methods for generating instructions executable by controllers to shift a plurality of differently configured transmissions via a single common software framework. The executable instructions and controllers may be included in a vehicle as shown in FIG. 1. The executable instructions may be disseminated to the controllers via a system as shown in FIG. 2. An example transmission that may be shifted via a controller is shown in FIG. 3. An example method for generating instructions executable by controllers to shift a plurality of differently configured transmissions via a single common software framework is shown in FIG. 4. An example stick diagram and features of an abstract transmission are shown in FIGS. 5A-5C. Example tables that may be generated via the common software framework described herein are shown in FIGS. 6-16.

The system and methods described herein provide for numerous features to meet the requirements for shifting a variety of transmission configurations. In particular, "odd gears" (e.g., gears that transmit torque from a first transmission input shaft to the transmission output shaft) may be selected via tables that may be reconfigured for differently configured transmissions. Likewise, "even gears" (e.g., gears that may transmit torque from a second transmission input shaft to the transmission output shaft) may be selected via the tables that may be reconfigured according to transmission hardware so that transmissions having different configurations may be controlled via instructions generated from a common software framework. The system and methods also permit "odd gears" and "even gears" to be selected simultaneously so that gears may be preselected, which may permit continuous torque delivery through a transmission during transmission gear shifting. Simultaneous selection of two transmission gears may be permitted by holding one input clutch of the transmission open while the other input clutch of the transmission may be closed.

The system and methods may also provide for not permitting engagement of two gears that may provide torque via a common torque path (e.g., from the first transmission input shaft to the transmission output shaft). Thus, the system and method described herein may require that a gear to be engaged is included in a torque path that is different than the torque path of a presently engaged gear. The system and methods of the present description may also provide for optimizing shift times of a transmission while providing continuous torque delivery through a transmission by prohibiting sequential shifts between gears that transfer torque through a common "odd" or "even" torque path. For example, if a transmission is engaged in $8^{th}$ gear and a desired gear is $2^{nd}$ gear, but $8^{th}$ gear and $2^{nd}$ gear are both part of an "odd" torque path, then the transmission may be shifted to $7^{th}$ gear, which may be part of an "even" torque path, before the transmission is shifted to $2^{nd}$ gear. According to the present description, an order of operation of shift actuators may also be provided to optimize shifting. Additionally, "change of mind" conditions may be supported such that engagement of a particular gear may be aborted and a substitute gear may be engaged if a vehicle operator changes a commanded torque or power. In addition, the system and methods described herein may permit transmission system monitoring to avoid undesired transmission operation. For example, gear engagements that may be undesirable (e.g., engaging two gears that are common to a same input shaft and a common layshaft/output shaft) may be determined from transmission definition tables so that such gear engagements may be avoided.

FIG. 1 illustrates an example vehicle propulsion system 100 for vehicle 10. Vehicle propulsion system 100 includes at least one propulsion source 102. The propulsion source 102 may be an electric machine, an internal combustion engine, or a combination of an electric machine and an internal combustion engine. Throughout the FIG. 1, mechanical connections between various components are illustrated as solid lines, whereas electrical connections between various components are illustrated as dashed lines.

Vehicle propulsion system 100 may include a front axle (not shown) and a rear axle 122. In some examples, rear axle may comprise two half shafts, for example first half shaft 122a, and second half shaft 122b. Vehicle propulsion system 100 further has front wheels 130 and rear wheels 131. The rear axle 122 is coupled to transmission 14 via driveshaft 170. Rear axle 122 may transfer power from propulsion source 102 to generate rotation of drive wheels 131. Rear axle 122 may include a differential 191.

In one example, transmission 14 is a dual clutch transmission (DCT); however, transmission 14 may be a single clutch transmission or another type of transmission. As such, it should be appreciated that the example transmission configurations described herein should not be considered as limiting the scope of the present description. A detailed view of the DCT is provided in FIG. 3. As will be discussed in further detail below with regard to FIG. 3, transmission 14 may shift gears by selectively opening and closing first and second clutches.

Controller 12 may communicate with actuators and sensors of transmission 14. An additional controller, or controller 12, may communicate with actuators and sensors of propulsion source 102. Controller 12 may also receive gear requests and requests for output of propulsion source 102 from a human operator (not shown), or an autonomous controller (not shown). Controller 12 is shown receiving information from a plurality of sensors 154 (various examples of which are described herein) and sending control signals to a plurality of actuators 156 (various examples of which are described herein). As one example, sensors 154 may include a transmission input shaft speed sensor, a transmission output shaft speed sensor, shift fork position sensors, shift actuator position sensors, a transmission range (TR) sensor and fork position sensors to detect position of gear selector forks (e.g. 372, 376, 378, 382 of FIG. 3), and transmission temperature sensors. Actuators 156 may include gear shifting actuators (e.g., motors, hydraulic cylinders, or solenoids) and clutch actuators (e.g., motors, hydraulic cylinders, or solenoids).

Vehicle 10 may include dashboard 135 with a display system 132 configured to display information to the vehicle operator. Display system 132 may comprise, as a non-limiting example, a touchscreen, or human machine interface (HMI), display which enables the vehicle operator to view graphical information as well as input commands. In some examples, display system 132 may be connected wirelessly to the internet (not shown) via controller (e.g. 12). As such, in some examples, the vehicle operator may communicate via display system 132 with an internet site or software application (app).

Dashboard 130 may further include an operator interface 134 via which the vehicle operator may adjust the operating status of the vehicle including transmission 102. Specifically, the operator interface 134 may be configured to initiate and/or terminate operation of the vehicle driveline (e.g., propulsion source 102 and transmission 14) based on an operator input. Various examples of the operator interface 134 may include interfaces that require a physical apparatus, such as an active key, that may be inserted into the operator interface 134 to start the propulsion source 102 and turn on the vehicle, or may be removed to shut down the propulsion source 102 and turn off the vehicle. Display system 132 and operator interface 134 may also communicate with controller 12 to exchange data.

Controller 12 may include a processor 114, read-only memory (non-transitory memory) 116, random access memory 160, and inputs/outputs 118 (e.g., digital inputs, digital outputs, analog inputs, analog outputs, counters/timers, and communications ports).

Referring now to FIG. 2, a system 200 for generating executable transmission control instructions (e.g., code or instructions that are executable via a controller) is shown. The system of FIG. 2 may include a common software framework as described herein.

System 200 includes a computer 201 that includes a central processing unit (CPU) or processor 202 and a display 208. Computer 201 may be a personal computer or client that may be in electrical communication with optional server 220. Computer 201 may include non-transitory memory (e.g., disk drive, tape drive, optical drive, etc.) 203 for storing application software for generating executable code for a plurality of transmission controllers 12 and 212, random access memory 204, and inputs/outputs (e.g., communication network interfaces, serial/parallel ports, etc.) 205. Computer 201 may communicate with optional server 220 via wired or wireless network 221. Computer 201 may share files including executable instructions for a plurality of transmission controllers 12 and 212. In some examples, computer may transfer executable instructions to controllers 12 and 212 via wired or wireless network 210. Human users 250 may input commands and requests to computer 201 via human/machine interface 206 (e.g., a keyboard or microphone).

Optional server 220 may store files and data from computer 201. In addition, server 220 may transfer executable instructions received from computer 201 to controllers 12 and 212 via network 221. The executable instructions may be executed via controllers 12 and 212. Optional server 220 may include a processor, non-transitory memory, and random access memory (not shown). In some examples, optional server 220 may generate executable instructions for transmission controllers 12 and 212 according to input received from human user/implementer 250 via computer 201.

Vehicle 10 and its components including transmission controller 12 and transmission 14 may be of the type described in the description of FIG. 1. Transmission 14 may be a dual clutch transmission as previously mentioned. Transmission 14 may include a predetermined actual total number of thirteen forward gears (e.g., 1-13), an actual total number of one reverse gear, and two clutches (not shown). Controller 12 may be in electrical communication with transmission sensors 154 and transmission actuators 156 for shifting gears of transmission 14. Transmission controller 12 may be programmed at its time of manufacture with executable instructions generated via computer 201.

Vehicle 210 and its components including transmission controller 212 and transmission 214 may be similar or different from the type of controller 12 and transmission 214. For example, transmission 214 may include an actual total number of thirteen forward gears, an actual total of two reverse gears, and two clutches. Controller 212 may be in electrical communication with transmission sensors 254 and transmission actuators 256 for shifting gears of transmission 214. Transmission controller 212 may be programmed at its time of manufacture with executable instructions generated via computer 201.

Thus, the system of FIG. 2 may generate executable instructions for shifting gears of transmission 14 via transmission controller 12 and executable instructions for shifting gears of transmission 214 via transmission controller 212. The executable instructions may be generated via a common frame work of software executable instructions that are stored within computer 201, or alternatively, within server 220.

Thus, the system of FIGS. 1 and 2 provides for a common system for generating executable instructions for shifting specific transmissions, comprising: a computer readable medium including executable instructions to generate a first group of tables and a second group of tables, the first group of tables describing torque paths through a first transmission, the second group of tables describing torque paths through a second transmission, receive data into the first group of tables and the second group of tables via a user, generate executable instructions for a first transmission controller to shift the first transmission according to data in the first group of tables, generate executable instructions for a second transmission controller to shift the second transmission according to data in the second group of tables, the first transmission configured with torque paths that are different than torque paths of the second transmission. The common system further comprises additional executable instructions to transfer the generated executable instructions to shift the first transmission to a first transmission controller.

In some examples, the common system further comprises additional executable instructions to transfer the generated executable instructions to shift the second transmission to a second transmission controller. The common system includes where the torque paths through the first transmission include an input shaft, one or more gears, and an output shaft. The common system includes where shifting the first transmission includes adjusting a position of one or more actuators of the first transmission, and where shifting the second transmission includes adjusting a position of one or more actuators of the second transmission. The common system includes where the one or more actuators of the first transmission adjust a position of one or more sleeves of the first transmission, and where the one or more actuators of the second transmission adjust a position of one or more sleeves of the second transmission. The common system includes where the first group of tables includes a table that describes an order of gear ratio engagements to deliver a requested transmission gear ratio.

The system of FIGS. 1 and 2 also provides for a system for generating executable instructions for shifting a transmission, comprising: a computer readable medium including executable instructions to generate a group of tables, the group of tables describing one or more transmission torque path hardware configurations and an actuator configuration, and shift the transmission according to output of the group of tables. The system further comprises additional executable instructions to transfer the generated group of tables to a transmission controller. The system includes where the one or more transmission torque path hardware configurations include an input shaft, one or more gears, and an output shaft. The system includes where shifting the transmission includes adjusting a position of one or more actuators of the transmission. The system includes where the one or more actuators of the transmission adjust a position of one or more sleeves of the transmission. The system includes where the group of tables includes a table that describes an order of gear ratio engagements to deliver a requested transmission gear ratio.

Referring now to FIG. 3, a detailed illustration of an example dual clutch transmission (DCT) 14 is shown. An engine crankshaft 40B is illustrated as being coupled to a clutch housing 393. Alternatively, a shaft may couple engine crankshaft 40B to clutch housing 393. Clutch housing 393 may spin in accordance with rotation of crankshaft 40B. Clutch housing 393 may include a first clutch 388 and a second clutch 389. Furthermore, each of first clutch 388 and second clutch 389 have an associated first clutch plate 390, and a second clutch plate 391, respectively. In some examples, the clutches may comprise wet clutches, bathed in oil (for cooling), or dry plate clutches. Engine torque may be transferred from clutch housing 393 to either first clutch 388 or second clutch 389. First transmission clutch 388 transfers torque between propulsion source 102 (shown in FIG. 1) and first transmission input shaft 302. Second transmission clutch 127 transfers torque between propulsion source 102 (shown in FIG. 1) and second transmission input shaft 304.

The transmission 14 may include a plurality of gears, as discussed above. In this example, there are two transmission input shafts, including first transmission input shaft 302, and second transmission input shaft 304. Second transmission input shaft 304 is hollow, while first transmission input shaft 302 is solid, and it sits coaxially within the second transmission input shaft 304. As an example, first transmission input shaft 302 may have a plurality of fixed gears. For example, first transmission input shaft 302 may include first fixed gear 306 for receiving first gear 320, and third fixed gear 310 for receiving third gear 324, fifth fixed gear 314 for receiving fifth gear 328. In other words, first transmission input shaft 302 may be selectively coupled to a plurality of odd numbered gears. Second transmission input shaft 304 may include second fixed gear 308 for receiving second gear 322, or a reverse gear 318, and may further include fourth fixed gear 316, for receiving either fourth gear 326 or sixth gear 330. It may be understood that both first transmission input shaft 302 and second transmission input shaft 304 may be connected to each of first clutch 388 and second clutch 389 via spines (not shown) on the outside of each shaft, respectively. In a normal resting state, each of first clutch 388 and second clutch 389 are held open, for example via springs (not shown), etc., such that no torque from a propulsion source (e.g. 110) may be transmitted to first transmission input shaft 302 or second transmission input shaft 304 when each of the respective clutches are in an open state. Responsive to closing first clutch 388, propulsion source torque may be transmitted to first transmission input shaft 302, and responsive to closing second clutch 389, propulsion source torque may be transmitted to second transmission input shaft 304. During normal operation, transmission controller 12 may ensure that only one clutch is fully closed at any given time.

Transmission 14 may further include a first layshaft shaft 340, and second layshaft shaft 342. Gears on first layshaft shaft 340 and second layshaft shaft 342 are not fixed, but may freely rotate. In example DCT 14, first layshaft shaft 340 includes first gear 320, second gear 322, and sixth gear 330. Second layshaft shaft 342 includes third gear 324, fourth gear 326, fifth gear 328, and reverse gear 318. First layshaft shaft 340 may transfer torque via a first output pinion 350 and second layshaft shaft 342 may transfer torque via a second output pinion 352. The first output pinion 350 and the second output pinion may transfer torque to gear 353. In this way, both layshafts may transfer torque via each of first output pinion 350 and second output pinion 352, to output shaft 362, where the output shaft 362 may transfer torque to a differential 191 (shown in FIG. 1) which may enable each of the driven wheels (e.g. 131 of FIG. 1) to rotate at different speeds, for example when performing turning maneuvers.

As discussed above, each of first gear 320, second gear 322, third gear 324, fourth gear 326, fifth gear 328, sixth gear 330, and reverse gear 318 are not fixed to layshafts (e.g. 340 and 342), but instead may freely rotate. As such, sleeves including synchronizers may be utilized to enable each of the gears to match the speed of the layshafts, and may further be utilized to lock the gears. In example DCT 125, four sleeves including synchronizers are illustrated, for example, first synchronizer 370, second synchronizer 374, third synchronizer 380, and fourth synchronizer 384. First synchronizer 370 includes corresponding first selector fork 372, second synchronizer 374 includes corresponding selector fork 376, third synchronizer 380 includes corresponding third selector fork 378, and fourth synchronizer 384 includes corresponding fourth selector fork 382. Each of the selector forks may enable movement of each corresponding sleeve and synchronizer to lock one or more gears to a layshaft, or to unlock one or more gears from a layshaft. For example, first synchronizer 370 may be utilized to lock first gear 320. Second synchronizer 374 may be utilized to lock either second gear 322 or sixth gear 330. Third synchronizer 380 may be utilized to lock either third gear 324 or fifth gear 328. Fourth synchronizer 384 may be utilized to lock either fifth gear 328, or reverse gear 318. In each case, movement of the synchronizers may be accomplished via the selector forks (e.g. 372, 376, 378, and 382) moving each of the respective synchronizers to the desired position via actuators (e.g., motors or hydraulic cylinders) 388a-388d.

Movement of synchronizers via selector forks may be carried out via transmission controller 12 and shift fork actuators 388a-388d, where transmission controller 12 may include the components discussed above with regard to FIG. 1. Shift fork actuators may be operated electrically, hydraulically, or a combination of electric and hydraulic. Hydraulic power may be provided via a pump (not shown). Transmission controller 12 may collect input signals from various sensors, assess the input, and control various actuators accordingly. Inputs utilized by transmission controller may include but are not limited to transmission range (P/R/N/D/S/L, etc.), vehicle speed, ambient temperature, brake inputs, and gear box input shaft speed (for both first transmission input shaft 302 and second transmission input shaft 304). The transmission controller 12 may control actuators via an open-loop control, or closed-loop control, and adaptive control. For example, adaptive control may enable transmission controller 12 to identify and adapt to clutch engagement points, clutch friction coefficients, and position of synchronizer assemblies. Transmission controller 12 may also adjust first clutch actuator 389 and second clutch actuator 387 to open and close first clutch 126 and second clutch 127. First clutch actuator 389 and second clutch actuator 387 may be operated electrically, hydraulically, or a combination of electric and hydraulic.

Transmission 14 may be understood to function as described herein. For example, when first clutch 388 is actuated closed, engine torque may be supplied to first transmission input shaft 302. When first clutch 388 is closed, it may be understood that second clutch 389 is open, and vice versa. Depending on which gear is locked when first clutch 388 is closed, power may be transmitted via the first transmission input shaft 302 to either first layshaft 340 or second layshaft 342, and may be further transmitted to output shaft 362 via either first pinion gear 350 or second pinion gear 352. Alternatively, when second clutch 389 is closed, power may be transmitted via the second transmission input shaft 304 to either first layshaft 340 or second layshaft 342, depending on which gear is locked, and may be further transmitted to output shaft 362 via either first pinion gear 350 or second pinion gear 352. It may be understood that when torque is being transferred to one layshaft (e.g. first output shaft 340), the other layshaft (e.g. second output shaft 342) may continue to rotate even though only the one shaft is driven directly by the input. More specifically, the non-engaged shaft (e.g. second layshaft 342) may continue to rotate as it is driven indirectly by the output shaft 362 and respective pinion gear (e.g. 352).

Transmission 14 may enable preselection of gears, which may thus enable rapid switching between gears with minimal loss of torque during shifting. As an example, when first gear 320 is locked via first synchronizer 370, and wherein first clutch 388 is closed (and second clutch 389 is open), power may be transmitted from the engine to first input shaft 302, and to first layshaft 340. While first gear 320 is engaged, second gear 322 may simultaneously be locked via second synchronizer 374. Because second gear 322 is locked, this may rotate second input shaft 304, where the second input shaft 304 is speed matched to the vehicle speed in second gear. In an alternative case where a gear is pre-selected on the other layshaft (e.g. second layshaft 342), that layshaft will also rotate as it is driven by output shaft 362 and pinion 352.

When a gear shift is initiated by controller 12, only the clutches need to be actuated to open first clutch 388 and close second clutch 389. Furthermore, propulsion source speed may be lowered to match the input shaft of the next gear during an upshift. With the second clutch 389 closed, power may be transmitted from the propulsion source, to second input shaft 304, and to first layshaft 340, and it may be further transmitted to output shaft 362 via pinion 350. Subsequent to the shifting of gears being completed, controller 12 may pre-select the next gear appropriately. For example, controller 12 may pre-select either a higher or a lower gear, based on input it receives from various sensors 154. In this way, gear changes may be achieved rapidly with minimal loss of engine torque provided to the output shaft 362.

An example of a torque path through transmission 14 is indicated by arrows 399. In this example, the torque path applies to when second gear is engaged. The torque path begins at shaft 40B and it goes through second clutch 389 and into second shaft 304. Torque that is input to the second shaft 304 continues through second gear and on to first layshaft 340. Torque is transferred from first layshaft 340 to output shaft 362 via first output pinion gear 350 and gear 353 as indicated by arrows 399. Thus, a torque path through a transmission may be a path that torque follows to flow through the transmission, and the torque path may include gears, shafts, and clutches.

Referring now to FIG. 4, an example method for generating controller instructions for a plurality of transmissions having dissimilar gear configurations via a common software framework is shown. The method of FIG. 4 may be incorporated into and may cooperate with the system of FIGS. 1 and 2. Further, at least portions of the method of FIG. 4 may be incorporated as executable instructions stored in non-transitory memory of a computing system while other portions of the method may be performed via the computing system transforming operating states of devices and actuators in the physical world. For example, the computing system may generate executable instructions for a controller and store the executable instructions to non-transitory memory in the system or to an external controller.

Figure 6:
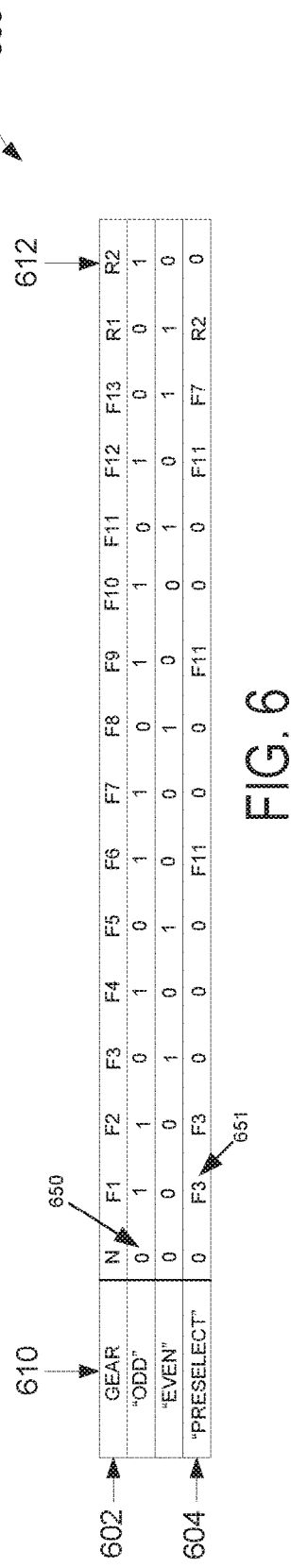
FIGS. 6-16 are example tables that may be generated via the common software framework to shift transmissions.

At 402, method 400 displays tables for specifying software parameters pertaining to a particular transmission that is to be shifted. Non-limiting examples of the tables are shown in FIGS. 6-16. The tables may include cells for inputting data to define transmission hardware (e.g., transmission shaft arrangements, gear arrangements, actuator arrangements, etc.) and transmission actuators as well as relationships between the transmission hardware and the actuators. For example, a user/implementer may input data to the tables to define a transmission that includes two transmission input shafts. The input data may also define a torque path through the transmission and transmission gears that are to be assigned to "odd" and "even" torque paths as shown in FIG. 6. The "odd" torque path may be for gears that receive torque via the first transmission input shaft and the "even" torque path may be for gears that receive torque via the second transmission input shaft. The tables may also include a table defining coupled configuration states as described further with regard to FIG. 7. The tables are displayed to the user/implementer and the user/implementer may enter values into the tables to further define how the transmission operates. Method 400 accepts the data from the user/implementer and stores the values of the data into non-transitory memory. Method 400 proceeds to 404 after generating the tables.

At 404, method 400 generates executable instructions for shifting the transmission that is input to the system via the tables described at 402. The instructions may be applied by a transmission controller (e.g., 12 or 212 of FIG. 1) to shift a transmission. Thus, a computer or server may generate instructions for a controller that is installed in a vehicle. The instructions may be transferred to the controller via a network as discussed with regard to FIG. 2, Generating the instructions may include steps 406-420.

At 406, method 400 generates executable instructions for receiving a requested gear. The requested gear data may be received via the controller and the data may be provided via a transmission range or gear selector. In one example, method 400 includes generating executable instructions to poll digital inputs and/or analog inputs to determine the position of the gear range selector. Method 400 proceeds to 408 after generating executable instructions for receiving the requested gear.

At 408, method 400 generates executable instructions for assigning actuators used to uncouple a presently engaged transmission gear ratio. For example, if the transmission is of the type shown in FIG. 5A and the presently engaged gear is second gear, method 400 may reference a table that is similar to table 700 shown in FIG. 7 to determine that uncoupling second gear requires disengaging coupling configuration states H, B, and D in the order described in FIG. 16, or alternatively, according to the order indicated in FIG. 7. Method 400 proceeds to 410.

At 410, method 400 generates executable instructions to determine the mechanical actuators for decoupling the coupling configuration states from definitions provided in the tables described herein. For example, method 400 may generate instructions to reference one or more tables described herein (e.g., FIG. 13) and data input to the tables by the user/implementer to determine that mechanical actuator "0" may control the operating state of coupling configuration state B, mechanical actuator "4" may control the operating state of coupling configuration H, and mechanical actuator "1" may control the operating state of coupling configuration D. Method 400 proceeds to 412.

At 412, method 400 generates executable instructions for disengaging an engaged transmission gear ratio. The executable instructions may determine mechanical actuators that are used to disengage the engaged gear from step 410 according to one or more tables described herein. The gears that are engaged to produce the engaged transmission gear may be disengaged by commanding gear actuators via controller digital outputs in an order according to the order of actuator operation that was determined at step 408. Method 400 proceeds to 414.

At 414, method 400 generates executable instructions for assigning actuators used to engage a requested transmission gear ratio. For example, if the transmission is of the type shown in FIG. 5A and the presently engaged gear is third gear and fourth gear is requested, method 400 may reference a table that is similar to table 700 shown in FIG. 7 to determine that engaging fourth gear requires engaging coupling configuration state E. Method 400 proceeds to 416.

At 416, method 400 generates executable instructions to determine the mechanical actuators for coupling the coupling configuration states from the definitions provided in the tables described herein. For example, method 400 may generate instructions to reference a table that defines which mechanical actuator may engage a coupling configuration (e.g., FIG. 13). For example, method 400 may determine that mechanical actuator mechanical actuator "4" may control the operating state of coupling configuration H. Method 400 proceeds to 418.

At 418, method 400 generates executable instructions for engaging the requested transmission gear ratio. The executable instructions may determine actuators to engage the requested gear from step 406 and gears that are engaged to provide the requested transmission gear are engaged by commanding gear actuators via digital outputs in an order according to the order of actuator operation that was determined at step 414. The actuators for shifting the transmission may be determined via tables similar to those described herein (e.g., FIG. 13). Method 400 proceeds to 420.

At 420, method 400 may store all of the generated executable instructions (e.g., as described in steps 402-418) to non-transitory memory with the computer system. Further, in some examples, method 400 may transfer the generated executable instructions to one or more transmission controller so that a transmission may be controlled according to the executable instructions. Method 400 proceeds to exit.

The common software framework of executable instructions that is described in method 400 to generate the executable instructions for shifting a plurality of transmissions having different torque paths, gear configurations, shaft configurations, and clutch configurations may generate unique executable instruction for each transmission that has a unique torque path, gear configuration, shaft configuration, and/or clutch configuration. For example, method 400 may generate executable instructions to shift a single clutch transmission that includes five forward gears. Method 400 may also generate executable instructions to shift a dual clutch transmission that includes 10 forward gears, the instructions to shift the single clutch transmission different from the instructions to shift the dual clutch transmission.

In addition, the common software framework of executable instructions that is described in method 400 provides for generating executable instructions for shifting a plurality of different transmissions (e.g., different torque paths, gear ratios, etc.) via generating common executable instructions for each transmission, excepting unique calibration parameters and tables for the plurality of different transmissions.

Thus, the method of FIG. 4 provides for a method for shifting a transmission of a vehicle, comprising: defining one or more transmission torque path hardware configurations and an actuator configuration via one or more tables, the tables populated according to the one or more torque path hardware configurations to define a relationship between the one or more torque path hardware configurations and the actuator configuration; and shifting the transmission according to output of the one or more tables. The method includes where the one or more tables includes a table that describes an order of gear ratio engagements to deliver a requested transmission gear ratio. The method further comprises receiving data input to the first group of tables via a human/machine interface. The method includes where a first of the one or more torque paths through the transmission is an "odd" torque path, and where a second of the one or more torque paths through the transmission is an "even" torque path. The method includes where the one or more tables include a table that describes gears associated with a first torque path and gears associated with a second torque path. The method includes where the one or more tables include a table that describes a coupling between a first input shaft of the transmission and a first layshaft of the transmission. The method includes where the table also describes a coupling between a second input shaft of the transmission and a second layshaft of the transmission.

Referring now to FIG. 5A, an example stick diagram 500 of an abstract transmission that may be generated by a human to determine values to input to the various tables described herein is shown. In this example, the stick diagram represents a dual clutch transmission and the dual clutch transmission shown in FIG. 5A is different than the dual clutch transmission that is shown in FIG. 3. Thus, it should be appreciated that different types of transmission configurations may be input to the tables. As such, the stick diagram of FIG. 5A should not be considered as limiting.

In this example, propulsion source 102 is located at the left side of FIG. 5A. The propulsion source 102 is shown coupled to a first input clutch 502 and a second input clutch 512. The first input clutch 502 is directly coupled to first transmission input shaft 504. The second transmission input clutch 512 is directly coupled to first input shaft 514. The first input shaft 504 and the second input shaft 514 may be coupled via coupling configuration 530. The first input shaft 504 may be coupled to first layshaft 506 via coupling configuration 532. The second input shaft 514 may be coupled to second layshaft 516 via coupling configuration 536. The first layshaft shaft 506 may be coupled to output shaft 508 via coupling configuration 534. The second layshaft shaft 516 may be coupled to output shaft 508 via coupling configuration 538. The output shaft 508 is directly coupled to the differential 518 and the differential 518 is coupled to the wheels 520.

FIG. 5B includes schematics of several example non-limiting coupling configurations that may be defined via user input to the tables described herein. A single actuator 2-state coupling configuration is shown at 540. Switch 542 represents a coupling mechanism to couple a gear ratio 544 to a shaft of the transmission. The single actuator 2-state coupling includes a coupled state (e.g., the gear is coupled to a shaft) and a decoupled state (e.g., the gear is not coupled to the shaft).

A single actuator 3-state coupling configuration is shown at 550. Switch 552 represents a coupling mechanism to couple gear ratios 544a and 544b to a shaft of the transmission. The single actuator 3-state coupling includes a state where one of gear ratios 544a is coupled to a transmission shaft, a state where the other of gear ratios 544b is coupled to the transmission shaft, and a state where both of gear ratios 544a and 544b are not coupled to the transmission shaft.

A two actuator 3-state coupling configuration is shown at 560. Switch 562 represents a first coupling mechanism to couple gear ratio ratios 544c and 544d to a shaft of the transmission. Switch 563 represents a second coupling mechanism to couple gear ratio ratios 544e and 544f to a shaft of the transmission. The two actuator 3-state coupling includes where a first actuator may couple gear ratio 544c to a transmission shaft, a state where the first actuator may couple the other of gear ratio 544d to the transmission shaft, and a state where the first actuator may uncouple both of gear ratios 544a and 544b from the transmission shaft. The two actuator 3-state coupling also includes where a second actuator may couple gear ratio 544e to a transmission shaft, a state where the second actuator may couple the other of gear ratio 544f to the transmission shaft, and a state where the second actuator may uncouple both of gear ratios 544e and 544f from the transmission shaft.

A user/implementer may also define what gear ratios are included in the coupling configurations that are shown in the transmission stick diagram. In this example, gear ratios are indicated by letters A, B, C, D, E, F, G, H, and I. Thus, coupling configuration 532 includes gears A, B, C, and D and one or more of the gears of the coupling configurations may be engaged to shift the transmission into a particular transmission gear ratio. Further, the user/implementer may also define how the transmission's mechanical actuators (e.g., sleeves, forks, etc.) may engage or disengage the ratios A-I as shown at 570. In this example, mechanical actuator "0" is defined to be a single actuator three state coupling device, and so on.

The user/implementer may define various control configuration states in the stick diagram as shown at 571. The control configuration states may be described as a state of one or more actuation devices, which permits only specific coupling/uncoupling of the mechanical actuators (by activation of other actuation devices). In other words, the control configuration states may be prepositioning states of shift actuation devices that allow a mechanical actuator to be positioned for engaging or disengaging a gear ratio. Control configuration states may be explained by way of an example. A five speed transmission may have a shift pattern as indicated at 575 of FIG. 5C. The transmission may include a shift lever (not show) that is moved from one position to another position to change gears of the transmission. In this example, the transmission has five gears and moving the shift lever to one of the numbered or lettered shifter positions allows a particular gear to be engaged. The shift lever may be connected to shifter linkage that translates motion of the shift lever to movement of shift forks, sleeves, and synchronizers. Similarly, shifter actuators may be coupled to switches or other devices to allow mechanical actuators to engage or disengage a particular gear. The shifter may be moved to a location of the shift pattern such as 577, 578, or 579 (e.g., control configuration states) where the shifter and shift linkage is prepositioned for engaging one or more gears. If the shift lever is moved to location 577, it is prepositioned to enable engagement of either $1^{st}$ gear or $2^{nd}$ gear. If the shifter lever is moved to location 578, it is prepositioned to enable engagement of either $5^{th}$ gear or reverse. Positions such as 577, 578, and 579 that preposition actuators to engage or disengage a gear may be described as control configuration states. The shift lever and linkage of the transmission may be replaced by electro-mechanical actuators such as motors and coupling configurations or switches to automate transmission gear shifting. The coupling configuration state and actuator state that move shifting actuators into position for engaging or disengaging gear ratios may be described as a particular control configuration state. For the stick diagram shown in FIG. 5A, five control configuration states are input by the user/implementer as indicated at 571.

Referring now to FIG. 6, an example table 600 that may be generated via executable instructions in the system of FIGS. 1 and 2 is shown. In particular, the executable instructions may generate the table of FIG. 6 via a graphic interface.

Table 600 is a table in which the user/implementer may define software parameters that describe the transmission gear layout and control actions for the transmission that is described in transmission stick diagram. Table 600 includes four rows, beginning at row one 602 and ending at row four 604. Table 600 includes seventeen columns, beginning at column one 610 and ending at column seventeen 612.

The first column and its associated first row is place holder for transmission "gear" to indicate that columns two through seventeen indicate the available gears for the transmission. Forward gears are described as F1-F13, where the "F" indicates a forward gear followed by a numerical value that indicates the transmission gear number. Reverse gears are described by R1 and R2, where "R" indicates a reverse gear followed by a numerical value that indicates the transmission gear number. N indicates neutral.

The first column and its associated second row is a place holder for "odd" to indicate which transmission gears transfer torque through the "odd" transmission input shaft. A value of zero in columns two through seventeen, second row indicates torque for the particular gear in the associated column does not transfer torque through the "odd" transmission input shaft (e.g., the first transmission input shaft). A value of one in columns two through seventeen, second row indicates torque for the particular gear in the associated column does transfer torque through the "odd" transmission input shaft (e.g., the first transmission input shaft).

The first column and its associated third row is a place holder for "even" to indicate which transmission gears transfer torque through the "even" transmission input shaft. A value of zero in columns two through seventeen, third row indicates torque for the particular gear in the associated column does not transfer torque through the "even" transmission input shaft (e.g., the second transmission input shaft). A value of one in columns two through seventeen, third row indicates torque for the particular gear in the associated column does transfer torque through the "even" transmission input shaft (e.g., the second transmission input shaft).

The first column and its associated fourth row is a place holder for "preselect" to indicate which transmission gears are required to be preselected. A zero in a cell indicates that no preselected gear is required while a gear reference (e.g., F3) indicates that a preselected gear is required. For example, $1^{st}$ gear torque path may include: $1^{st}$ clutch, input shaft 1, coupling x, input shaft 2, coupling y, layshaft 2, and the output shaft. The $3^{rd}$ gear path may include: clutch 2, input shaft 2, coupling y, layshaft 2, and the output shaft. Therefore, $1^{st}$ gear may have a strictly required preselect of 3rd gear, such that torque is transferred through the $3^{rd}$ gear coupling from clutch 1 when driving in $1^{st}$ gear.

Row one and its associated columns two though seventeen are place holders for the various transmission gears. Forward gears are prefixed by the letter F and reverse gears are prefixed by the letter R. N indicates neutral.

Rows two and three, and their associated columns two through seventeen, are cells that allow the user/implementer to input a value of zero or a value of one. A zero may be input by the user/implementer if torque is not transferred through the "odd" or the "even" shaft via the gear that defines a particular column. A one may be input by the user/implementer if torque is transferred through the "odd" or the "even" shaft via the gear that defines a particular column. For example, column 3 of table 600 includes a value of one for "odd" and a value of zero for "even." This defines forward first gear transfers torque through the "odd" transmission input shaft and not through the "even" transmission input shaft. Further, third gear is preselected when first gear is engaged.

A first cell for user input in table 600 is indicated at 650 and it includes a value of 0. This cell may be identified as cell (1 (row 1 of user input data area), 1 (column 1 of user input data area)). A second cell for user input in table 600 is indicated at 651 and it includes a value of F3. This cell may be identified as cell (3,2). Each of the tables describe herein include cells that may be identified in a similar way. Therefore, for the sake of brevity, descriptions of cells of the other tables described herein is omitted.

Figure 7:
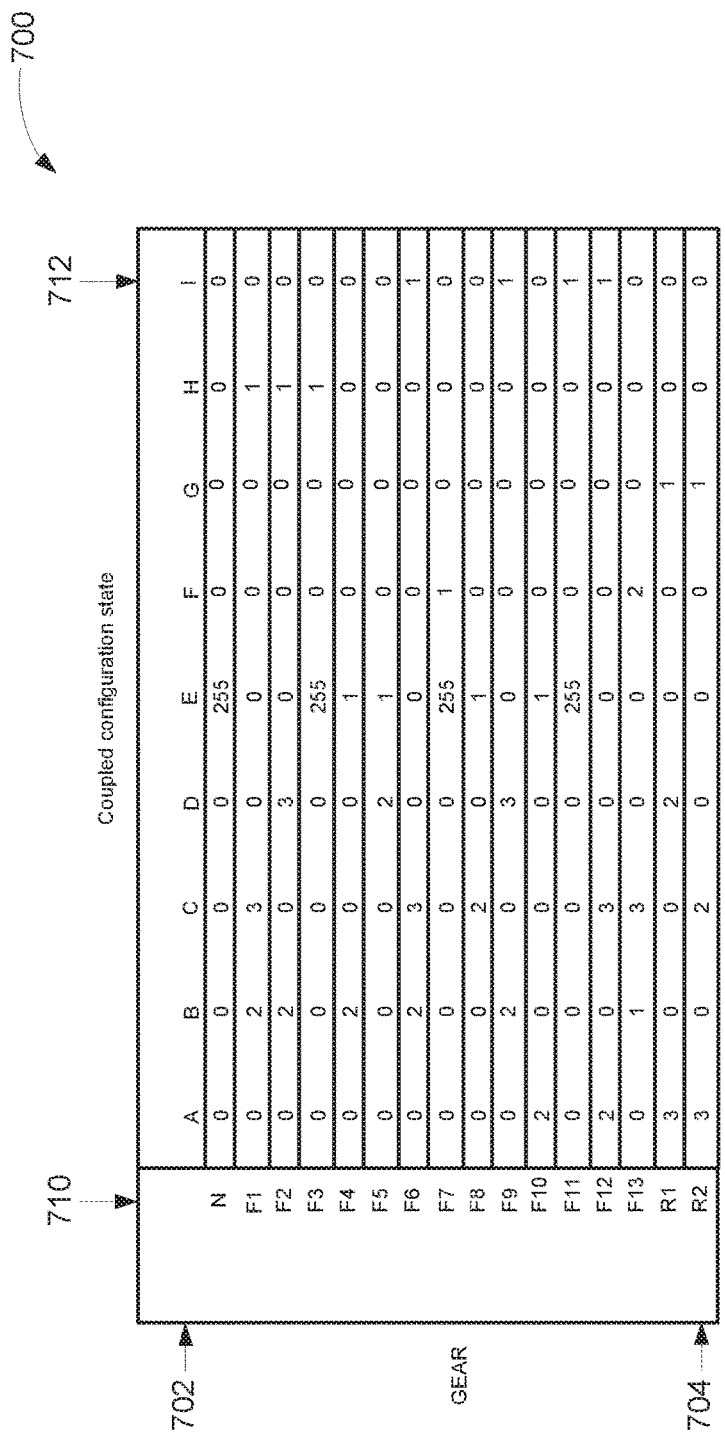

Referring now to FIG. 7, an example table 700 that may be generated via executable instructions in the system of FIGS. 1 and 2 is shown. In particular, the executable instructions may generate the table of FIG. 7 via a graphic interface.

Table 700 is a table in which the user/implementer may define coupled configuration states for each transmission gear. Table 700 includes seventeen rows, beginning at row one 702 and ending at row seventeen 704. Table 700 includes ten columns, beginning at column one 710 and ending at column ten 712.

The first row and its associated columns two through nine are place holders for labels (e.g., A-I) of coupled configuration states. The coupled configuration states may indicate ratios of gears in the transmission that may be combined to engage a particular transmission gear. The first column and its rows two though seventeen, are place holders for labels for the various transmission gears including neutral and reverse.

Rows two through seventeen in column one are place holders for the various transmission gears. Forward gears are prefixed by the letter F and reverse gears are prefixed by the letter R. N indicates neutral.

Columns two through ten and their associated rows two through seventeen may receive user/implementer input to describe the relationships between particular transmission gear ratios and coupled configuration states. User/implementer input values of zero indicate that the coupling configuration must not be set. User/implementer input values 1-254 indicate that the coupling configuration must be set in the order beginning with one and increasing in the prescribed order. Values of 255 indicate that the coupling state may be set, but it is not mandatory. For example, to engage first gear (F1) coupling state H must first be engaged, followed by engaging coupling state B, followed by engaging coupling state C.

Figure 8:
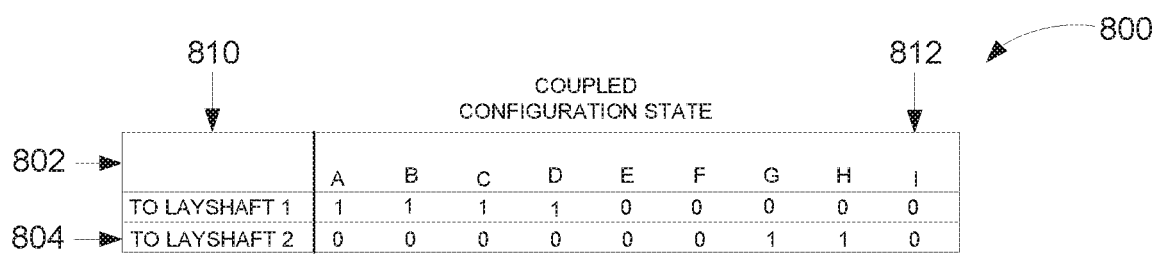

Referring now to FIG. 8, an example table 800 that may be generated via executable instructions in the system of FIGS. 1 and 2 is shown. In particular, the executable instructions may generate the table of FIG. 8 via a graphic interface.

Table 800 is a table in which the user/implementer may define the affected layshaft for the torque path of each coupled configuration state. Table 800 includes three rows, beginning at row one 802 and ending at row three 804. Table 800 includes ten columns, beginning at column one 810 and ending at column ten 812.

The first column and its associated second row is a place holder for "layshaft 1" to indicate that the first layshaft may be affected by the coupling configuration state. A value of zero in columns two through ten of the second row indicates that layshaft 1 is not affected by the coupling configuration state. A value of one in columns two through ten of the second row indicates that layshaft 1 is affected by the coupling configuration state.

The first column and its associated third row is a place holder for "layshaft 2" to indicate that the second layshaft may be affected by the coupling configuration state. A value of zero in columns two through ten of the third row indicates that layshaft 2 is not affected by the coupling configuration state. A value of one in columns two through ten of the third row indicates that layshaft 2 is affected by the coupling configuration state. Row one, and its columns two though ten, are place holders for the various coupled configuration states (A-I).

Rows two and three, and their associated columns two through ten, allow the user/implementer to input a value of zero or a value of one. A zero may be input by the user/implementer if a layshaft is not affected by the coupled configuration state. A value of one may be input by the user/implementer if the layshaft is affected by the coupled configuration state. Table 800 describes only the input shaft to layshaft coupling.

Figure 9:
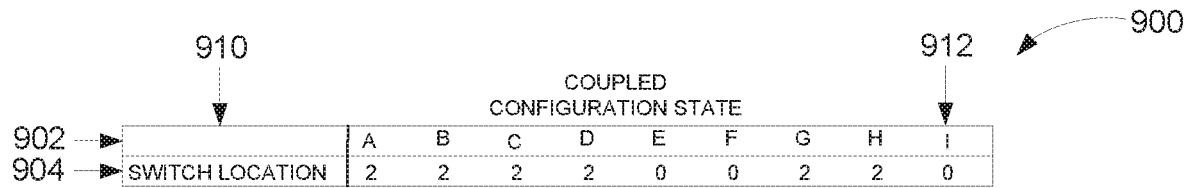

Referring now to FIG. 9, an example table 900 that may be generated via executable instructions in the system of FIGS. 1 and 2 is shown. In particular, the executable instructions may generate the table of FIG. 9 via a graphic interface.

Table 900 is a table in which the user/implementer may define a gear ratio location for each coupled configuration state, from which shaft speeds may be determined. Table 900 includes two rows, beginning at row one 902 and ending at row two 904. Table 900 includes ten columns, beginning at column one 910 and ending at column ten 912.

The first column and its associated second row is a place holder for "switch location" to indicate if the gear ratio comes before or after the switch location. A value of one in columns two through ten of the second row indicates that the switch is before the gear ratio. A value of two in columns two through ten of the second row indicates that the switch is after the gear ratio. Row one, columns two though ten are place holders for the various coupled configuration states.

Row two and its associated columns two through ten allow the user/implementer to input a value of one, a value of two, or a value of zero. A zero may be input by the user/implementer if the switch location is not applicable. A value of one may be input by the user/implementer if the switch location is before the gear ratio. A value of two may be input by the user/implementer if the switch location is after the gear ratio.

Figure 10:
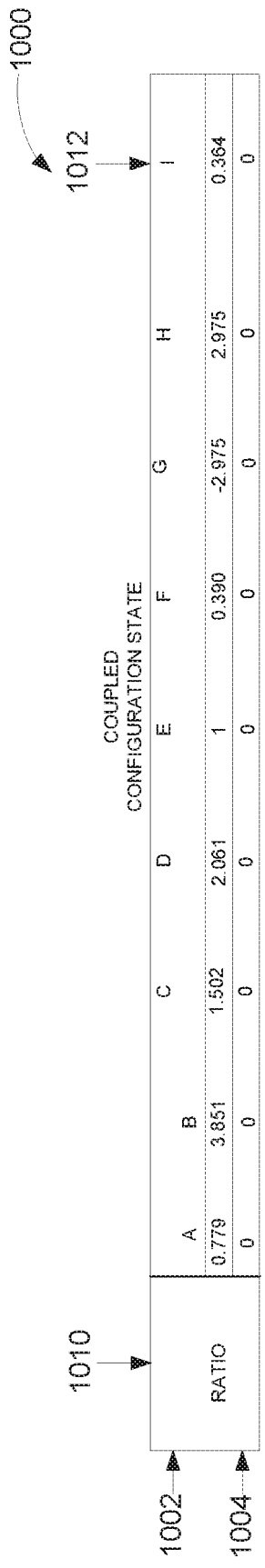

Referring now to FIG. 10, an example table 1000 that may be generated via executable instructions in the system of FIGS. 1 and 2 is shown. In particular, the executable instructions may generate the table of FIG. 10 via a graphic interface.

Table 1000 is a table in which the user/implementer may define a gear ratio for a particular coupled configuration state so that ratios across a gear mesh may be defined. Table 1000 includes three rows, beginning at row one 1002 and ending at row three 1004. Table 1000 includes ten columns, beginning at column one 1010 and ending at column ten 1012.

Column one, row two is a place holder for "ratio" to indicate the gear ratio of the coupled configuration state.

Rows two and three and their associated columns two through ten allow the user/implementer to input values of the ratios of the coupled configuration states. Two rows may be provided to allow additional ratios for transmission configurations where a coupling configuration may include more than one gear mesh. A positive value indicates positive rotation of the transmission output shaft relative to the direction of rotation of the transmission input shaft. A negative value indicates reverse rotation of the transmission output shaft relative to the direction of rotation of the transmission input shaft.

Figure 11:
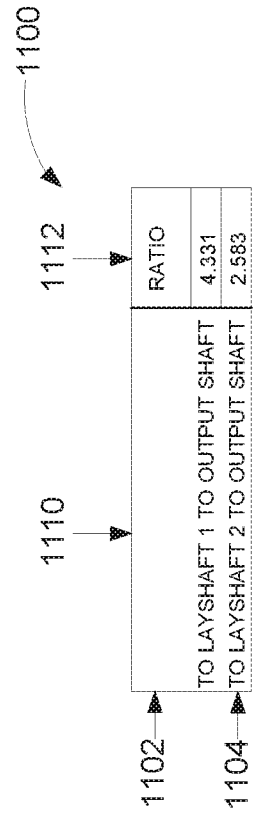

Referring now to FIG. 11, an example table 1100 that may be generated via executable instructions in the system of FIGS. 1 and 2 is shown. In particular, the executable instructions may generate the table of FIG. 11 via a graphic interface.

Table 1100 is a table in which the user/implementer may define a gear ratio between layshafts and the transmission output shaft. Table 1100 includes three rows, beginning at row one 1102 and ending at row three 1104. Table 1100 includes two columns, beginning at column one 1110 and ending at column two 1112.

The first column and its associated first and second rows are place holders for "layshaft 1 to output shaft" and "layshaft 2 to output shaft" to indicate ratios between layshafts and the transmission output shaft. The second column and its associated rows two and three are place holders to indicate the ratios between the lay shafts and the transmission output shaft. Rows two and three of column two allow the user/implementer to input values of the ratios between a layshaft and the transmission output shaft.

Figure 12:
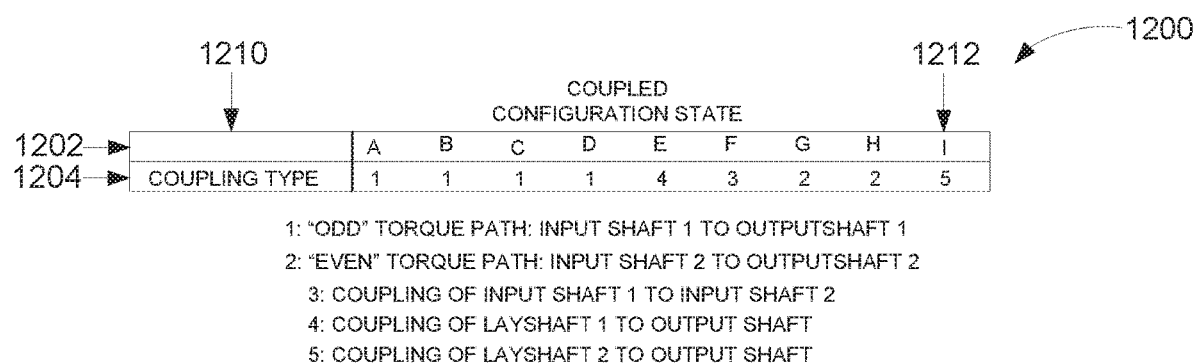

Referring now to FIG. 12, an example table 1200 that may be generated via executable instructions in the system of FIGS. 1 and 2 is shown. In particular, the executable instructions may generate the table of FIG. 12 via a graphic interface.

Table 1200 is a table in which the user/implementer may define a coupled configuration state to indicate if the coupled configuration state is used in an "odd" or "even" torque path and the segment of the torque path. It also allows the user/implementer to define if the coupled configuration state is for input shaft 1 (e.g., the first transmission input shaft) or transmission input shaft 2.

The first column and its associated second row is a place holder for "coupling type" to indicate the coupled configuration type. A value of one in columns two through ten of the second row indicates that the torque path is an "odd" torque path that allows torque to flow from the first input shaft to the output shaft. A value of two in columns two through ten of the second row indicates that the torque path is an "even" torque path that allows torque to flow from the second input shaft to the output shaft. A value of three in columns two through ten of the second row indicates that the torque path is from the first input shaft to the second input shaft. A value of four in columns two through ten of the second row indicates that the torque path is from the first layshaft (e.g., layshaft 1) to the transmission output shaft. A value of five in columns two through ten of the second row indicates that the torque path is from the second layshaft to the transmission output shaft. Row one and its associated columns two though ten are place holders for the various coupled configuration states. Rows two and its associated columns two through ten allow the user/implementer to input a value of one, a value of two, a value of three, a value of four, or a value of five to define relationships between coupled configuration states and coupling types.

Figure 13:
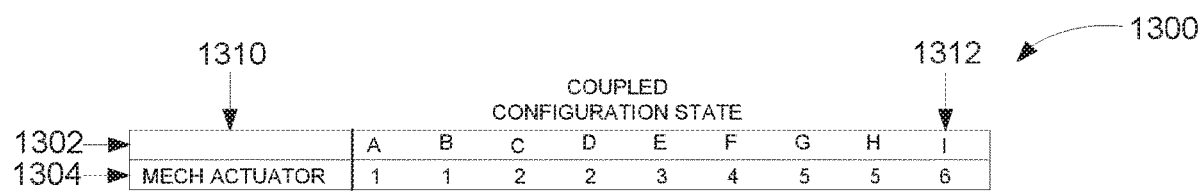

Referring now to FIG. 13, an example table 1300 that may be generated via executable instructions in the system of FIGS. 1 and 2 is shown. In particular, the executable instructions may generate the table of FIG. 13 via a graphic interface. Table 1300 is a table in which the user/implementer may define which mechanical actuator is associated with a particular coupled configuration state.

The first column and its associated second row is a place holder for "mechanical actuator" to indicate which mechanical actuator engages and disengages the coupled configuration state. A value of one in columns two through ten of the second row indicates that the coupled configuration state is engaged or disengaged via the first mechanical actuator. A value of two in columns two through ten of the second row indicates that the coupled configuration state is engaged or disengaged via the second mechanical actuator. A value of three in columns two through ten of the second row indicates that the coupled configuration state is engaged or disengaged via the third mechanical actuator. A value of four in columns two through ten of the second row indicates that the coupled configuration state is engaged or disengaged via the fourth mechanical actuator. A value of five in columns two through ten of the second row indicates that the coupled configuration state is engaged or disengaged via the fifth mechanical actuator. A value of six in columns two through ten of the second row indicates that the coupled configuration state is engaged or disengaged via the sixth mechanical actuator. Row one and its associated columns two though ten are place holders for the various coupled configuration states. Row two and its associated columns two through ten, allow the user/implementer to input a value of one, a value of two, a value of three, a value of four, or a value of five to define the relationships between coupled configuration states and mechanical actuators.

Figure 14:
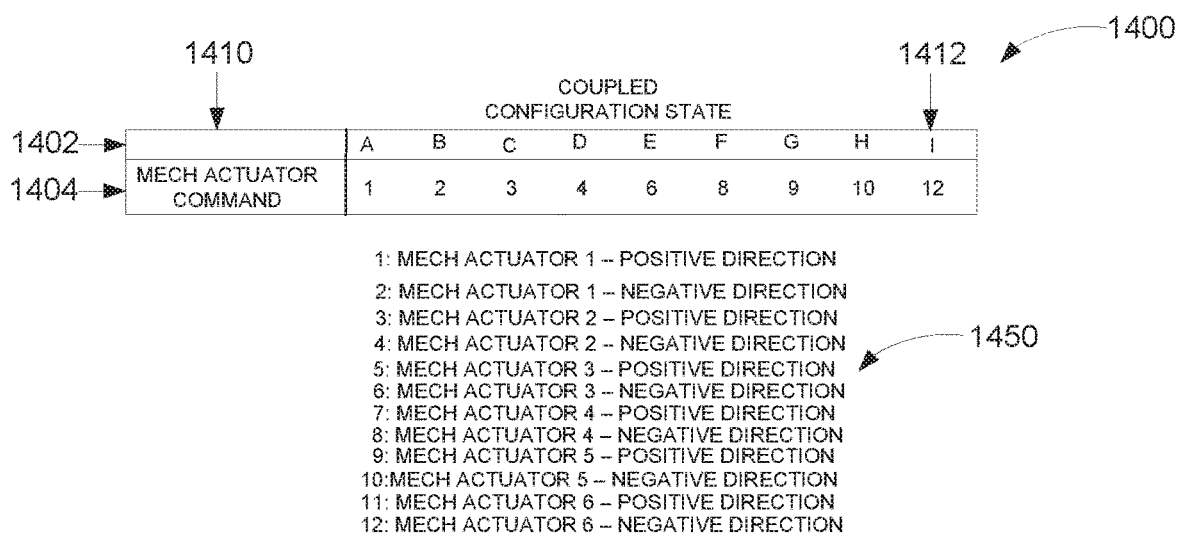

Referring now to FIG. 14, an example table 1400 that may be generated via executable instructions in the system of FIGS. 1 and 2 is shown. In particular, the executable instructions may generate the table of FIG. 14 via a graphic interface. Table 1400 is a table in which the user/implementer may define which mechanical actuator is associated with a particular coupled configuration state.

The first column, second row is a place holder for "mechanical actuator command" to indicate which mechanical actuator engages and disengages the coupled configuration state and the direction of engagement. The values that correspond to the mechanical actuators and direction of actuator movement are indicated at 1450. Row one and its associated columns two though ten are place holders for the various coupled configuration states (A-I). Row two and its associated columns two through ten allow the user/implementer to input a value between one and twelve to define the relationship between mechanical actuator commands and the coupled configuration states.

Figure 15:
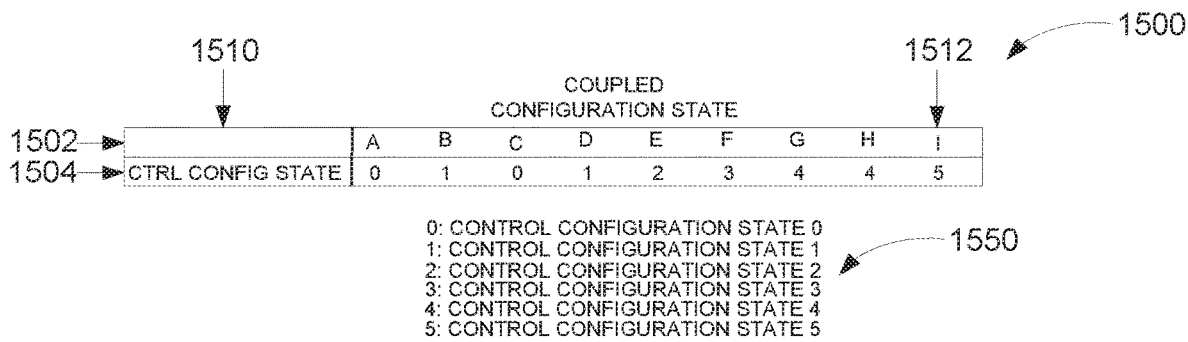

Referring now to FIG. 15, an example table 1500 that may be generated via executable instructions in the system of FIGS. 1 and 2 is shown. In particular, the executable instructions may generate the table of FIG. 15 via a graphic interface. Table 1500 is a table in which the user/implementer may define which control configuration state is associated with a particular coupled configuration state.

The first column, second row is a place holder for "control configuration state" to indicate which control configuration state is associated with engaging or disengaging a coupled configuration state. The values that correspond to the control configuration states are indicated at 1550. Row one and its associated columns two though ten are place holders for the various coupled configuration states (A-I). Row two and its associated columns two through ten allow the user/implementer to input a value between zero and five to define the relationship between coupled configuration states and control configuration states.

Figure 16:
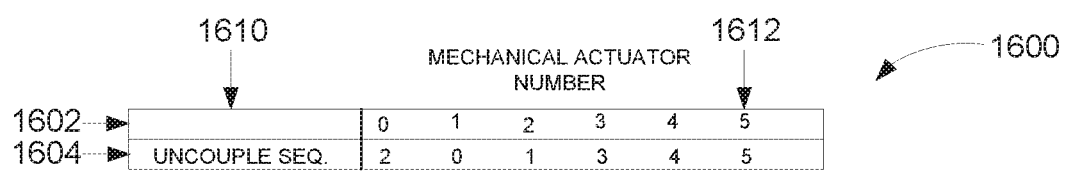

Referring now to FIG. 16, an example table 1600 that may be generated via executable instructions in the system of FIGS. 1 and 2 is shown. In particular, the executable instructions may generate the table of FIG. 16 via a graphic interface. Table 1600 is a table in which the user/implementer may define which control configuration state is associated with a particular coupled configuration state.

The first column, second row is a place holder for "uncoupling sequence" to indicate the order that uncoupling of an engaged transmission gear is to be accomplished. A lower value indicates a higher priority for uncoupling the transmission gear. Row one and its associated columns two though ten are place holders for the various coupled configuration states (A-I). Row two and its associated columns two through seven allow the user/implementer to input a value between zero and five to define the order of uncoupling of a transmission gear ratio.

Thus, the tables described in FIGS. 6-16 may be generated and referenced via a common software framework that generates executable instructions to shift a transmission. From values in the tables, the common software framework determines conditions to initiate a gear/neutral selection for "odd" and "even" transmission torque sides and determine conditions for completing of gear/neutral selection on "odd" and "even" sides of the transmission. The common software framework also determines mechanical actuators for coupling and uncoupling gears/shafts and the order of coupling and coupling of gears/shafts. Further, the common software framework may determine transmission states, perform diagnostics, perform mitigating actions, and manage possibilities for simultaneous multi-actuator coupling/uncoupling actions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to dual clutch transmissions, single clutch transmissions, transmissions having a first number of gear ratios (e.g., six), transmissions having a second number of gear ratios (e.g., ten), and transmissions having various shaft configurations.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for shifting a transmission of a vehicle, comprising:
defining one or more transmission torque path hardware configurations and an actuator configuration via one or more tables, the one or more tables including a first table populated according to the one or more torque path hardware configurations, where the first table receives a first input value to define a first transmission gear that transmits torque through a first transmission input shaft and a second input value to define that the first transmission gear does not transmit torque through a second transmission input shaft, where the first table receives the first input value to define a second transmission gear that transmits torque through a second transmission input shaft and the second input value to define that the second transmission gear does not transmit torque through the first transmission input shaft, the first transmission input shaft different from the second transmission input shaft and the first transmission gear different than the second transmission gear, the one or more tables configured to accept input for a plurality of different transmission hardware configurations, and receiving data input to the one or more tables via a human/machine interface, where the numeric values include a particular numeric value that indicates it is optional to engage one of the two or more gear ratios; and
shifting the transmission according to output of the one or more tables.

2. The method of claim 1, where the one or more tables includes a second table that is configured to receive input to define two or more gear ratios of the transmission that are selectively engaged to engage a sole forward gear, where the input includes numeric values that define an order of engagement of the two or more gear ratios to engage the sole forward gear such that gear ratios associated with lower numeric values are engaged before gear ratios associated with higher numeric values are engaged.

3. The method of claim 1, where a first of the one or more torque path hardware configurations through the transmission is an "odd" torque path, and where a second of the one or more torque path hardware configurations through the transmission is an "even" torque path, where the first value is a numeric value and the second value is a numeric value.

4. The method of claim 1, where the first table that describes gears associated with a first torque path and gears associated with a second torque path, where the actuator configuration defines a relationship between a plurality of actuators and the two or more gear ratios, and where the actuator configuration permits a two state actuator and a three state actuator, the two state actuator including an engaged state for a first gear ratio and a first disengaged state, the three state actuator including an engaged state for a second gear ratio, an engaged state for a third gear ratio, and a second disengaged state.

5. The method of claim 1, where the one or more tables include a second table that receives numeric input to define a coupling between a first input shaft of the transmission and a layshaft of the transmission.

6. The method of claim 5, where the one or more tables includes the second table that receives numeric input to define a coupling between a second input shaft of the transmission and the layshaft of the transmission, the first input shaft different than the second input shaft.

7. A system for generating executable instructions for shifting a transmission, comprising:
a computer readable medium including executable instructions to generate a group of tables and shift the transmission according to output of the group of tables, the group of tables describing one or more transmission torque path hardware configurations, a plurality of coupling configurations, and an actuator configuration, where the group of tables includes a first table that is configured to receive input to define three gear ratios of the transmission that are selectively engaged to engage a sole forward gear of the transmission, where the input includes three numeric values that define an order of engagement of the three gear ratios to engage the sole forward gear such that gear ratios associated with lower numeric values are engaged before gear ratios associated with higher numeric values are engaged, and a first of the plurality of coupling configurations configured to couple a first transmission input shaft to a second transmission input shaft at a first location and a second location, the first location between a first input clutch and a second coupling configuration, the second location between a second input clutch and a third coupling configuration.

8. The system of claim 7, further comprising additional executable instructions to transfer the generated group of tables to a transmission controller, and receiving data input to the group of tables via a human/machine interface, where the numeric values include a particular numeric value that indicates it is optional to engage one of the three gear ratios.

9. The system of claim 7, where the one or more transmission torque path hardware configurations include an input shaft, one or more gears, and an output shaft, where the actuator configuration defines a relationship between a plurality of actuators and the two or more gear ratios, and where the actuator configuration permits a two state actuator and a three state actuator, the two state actuator including an engaged state for a first gear ratio and a first disengaged state, the three state actuator including an engaged state for a second gear ratio, an engaged state for a third gear ratio, and a second disengaged state.

10. The system of claim 7, where shifting the transmission includes adjusting a position of one or more actuators of the transmission.

11. The system of claim 10, where the one or more actuators of the transmission adjust a position of one or more sleeves of the transmission.

12. The system of claim 7, where the order of coupling configuration engagement increases from a value of one.

* * * * *